United States Patent
Song et al.

(10) Patent No.: US 11,784,336 B2
(45) Date of Patent: Oct. 10, 2023

(54) FUEL CELL SYSTEM AND METHOD FOR CONTROLLING POWER THEREOF

(71) Applicant: HYUNDAI MOBIS CO., LTD., Seoul (KR)

(72) Inventors: Se Hoon Song, Yongin-si (KR); Young Hwang Kim, Yongin-si (KR); Jae Sung Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/565,814

(22) Filed: Dec. 30, 2021

(65) Prior Publication Data

US 2023/0133894 A1    May 4, 2023

(30) Foreign Application Priority Data

Oct. 28, 2021 (KR) .................... 10-2021-0145783

(51) Int. Cl.
  *H01M 8/04* (2016.01)
  *H01M 8/04858* (2016.01)
  *H02J 7/34* (2006.01)

(52) U.S. Cl.
  CPC ..... *H01M 8/04947* (2013.01); *H01M 8/0488* (2013.01); *H01M 8/0491* (2013.01); *H02J 7/345* (2013.01)

(58) Field of Classification Search
  CPC .......... H01M 8/04947; H01M 8/0488; H01M 8/0491
  See application file for complete search history.

(56) References Cited

U.S. PATENT DOCUMENTS

| 6,777,909 B1 | 8/2004 | Aberle et al. |
| 2014/0145500 A1* | 5/2014 | Kwon ............... B60L 58/33 307/9.1 |
| 2018/0233793 A1* | 8/2018 | Oya ............... H01M 10/425 |

FOREIGN PATENT DOCUMENTS

| JP | 2007-236132 A | 9/2007 |
| JP | 2018-67459 A | 4/2018 |
| KR | 10-2008-0053864 A | 6/2008 |
| KR | 10-2012-0008353 A | 1/2012 |

OTHER PUBLICATIONS

Extended European search report dated Jul. 8, 2022, in counterpart European Patent Application No. 22150473.1 (8 pages in English).
Korean Office Action dated Jul. 1, 2023, in counterpart Korean Patent Application No. 10-2021-0145783 (6 pages in English).

* cited by examiner

*Primary Examiner* — Olatunji A Godo
(74) *Attorney, Agent, or Firm* — NSIP Law (57) ABSTRACT

A fuel cell system includes a first converter to convert power, which is output from a fuel cell stack or a battery, into power in a specific level, a second converter to convert power which is input to or output from the battery, a power relay assembly to control power flow between a super capacitor and the first converter, and a controller to control outputs of the first converter and the second converter, depending on a starting state or an operating state of the fuel cell system, and to control an operation of the power relay assembly.

20 Claims, 9 Drawing Sheets

| CLASSIFICATION | OBJECT | DRIVING MODE | VOLTAGE SET | CURRENT SET | RESTRICTION CURRENT SET |
|---|---|---|---|---|---|
| FIRST CONVERTER (HDC) | CHARGING SUPER CAPACITOR | CONSTANT CURRENT | VOLTAGE OF SUPER CAPACITOR | DISCHARGEABLE CURRENT OF BATTERY -REQUIRED CURRENT OF AUXILIARY DEVICE | LIMIT CURRENT OF FIRST CONVERTER, OR ALLOWABLE CHARGE CURRENT OF SUPER CAPACITOR |
| SECOND CONVERTER (BHDC) | START FUEL CELL | CONSTANT VOLTAGE | STARTING VOLTAGE | — | LIMIT CURRENT OF SECOND CONVERTER, OR ALLOWABLE DISCHARGE CURRENT OF BATTERY |

| CLASSIFICATION | OBJECT | DRIVING MODE | VOLTAGE SET | CURRENT SET | RESTRICTION CURRENT SET |
|---|---|---|---|---|---|
| FIRST CONVERTER (HDC) | LOAD ENERGY BUFFER | CONSTANT CURRENT | VOLTAGE OF SUPER CAPACITOR | ADDED REQUIRED POWER OF FUEL CELL AND BATTERY/VOLTAGE OF SUPER CAPACITOR | LIMIT CURRENT OF FIRST CONVERTER |
| SECOND CONVERTER (BHDC) | FUEL CELL ENERGY BUFFER | CONSTANT VOLTAGE | TARGET VOLTAGE OF FUEL CELL | TARGET POWER OF BATTERY / VOLTAGE OF BATTERY | ALLOWABLE DISCHARGE CURRENT OF BATTERY |

FUEL CELL SYSTEM AND METHOD FOR CONTROLLING POWER THEREOF

CROSS-REFERENCE TO RELATED APPLICATION

This application claims the benefit of priority to Korean Patent Application No. 10-2021-0145783, filed in the Korean Intellectual Property Office on Oct. 28, 2021, the entire contents of which are incorporated herein by reference.

TECHNICAL FIELD

The present disclosure relates to a fuel cell system and a method for controlling power thereof.

BACKGROUND

A fuel cell system may generate electrical energy by using a fuel cell stack. For example, when hydrogen is used as fuel of the fuel cell stack, global environment problems may be solved. Accordingly, studies and researches have been consecutively performed on the fuel cell system.

A vehicle employing the fuel cell system may use, as a main power source, a fuel cell to generate electrical energy by using hydrogen fuel, and may include a hybrid power net employing a high voltage battery as a sub-power source, thereby switching an operating mode depending on a traveling situation such that the traveling efficiency is enhanced.

Recently, attempts have been made to apply the fuel cell system to a vehicle, such as an excavator, used in an industrial field.

A fuel cell system applied to the vehicle used in the industrial field includes a battery and a super capacitor in addition to a fuel cell. In this case, the fuel cell, the battery, and the super capacitor may be operated in a hybrid type, so the power efficiency may be enhanced. However, to operate each energy source in the hybrid type, at least three converters have to be provided in the power-net. The converter is a high-price part, so the costs may be increased.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a fuel cell system includes a first converter to convert power output from a fuel cell stack or a battery into power in a specific level, a second converter to convert power input to or output from the battery, a power relay assembly to control power flow between a super capacitor and the first converter, and a controller to control outputs of the first converter and the second converter depending on a starting state or an operating state of the fuel cell system, and to control the operation of the power relay assembly.

The first converter may be disposed on a main bus stage to connect the fuel cell stack to an inverter, and the second converter may have one end connected to the main bus stage between the fuel cell stack and the first converter, and may have an opposite end connected to the battery, and adjust bi-directional power flow.

The second converter may supply starting power of the fuel cell system and charging power of the super capacitor, by using power discharged from the battery, when the fuel cell system is started.

The first converter may supply the charging power, which is received from the second converter, to the super capacitor through the power relay assembly, when the fuel cell system is started.

The power relay assembly may adjust a voltage between an output stage of the first converter and the super capacitor by using a pre-charge relay before receiving the charging power through the first converter, and may supply the charging power to the super capacitor by using a main relay when the charging power is supplied through the first converter.

The controller may operate the first converter in a constant current mode and may operate the second converter in a constant voltage mode, when the fuel cell system is started.

The controller may set a starting voltage of the fuel cell stack as an output voltage of the second converter, and may set a limit current of the second converter or an allowable discharge current of the battery as a restriction current of the second converter, when the fuel cell system is started.

The controller may set a charging voltage of the super capacitor as the output voltage of the first converter, may set a value, which is obtained by subtracting a required current of an auxiliary device from the allowable discharge current of the battery, as an output current of the first converter, and may set a limit current of the first converter or an allowable charge current of the super capacitor as a restriction current of the first converter, when the fuel cell system is started.

The second converter may adjust and output power discharged from the battery, when the fuel cell system is operated, and the first converter may adjust power output through at least one of the fuel cell stack and the second converter and may output the adjusted power to the inverter, when the fuel cell system is operated The controller may operate the first converter in the constant current mode and the second converter in the constant voltage mode, when the fuel cell system is operated.

The controller may set the output voltage of the first converter, based on a measured voltage of the super capacitor, may set an output current of the first converter, based on the ratio between added required power of the fuel cell stack and the battery, and the measured voltage of the super capacitor, and may set the restriction current of the first converter, based on the limit current of the first converter.

The controller may set the output voltage of the second converter, based on a target voltage of the fuel cell stack, when the fuel cell system is operated, may set the output current of the second converter, based on the ratio between the target power of the battery and the measured voltage of the battery, and may set the restriction current of the second converter, based on the allowable discharge current of the battery.

The power relay assembly may supply power, which is discharged from the super capacitor, to the inverter, when the fuel cell system is operated.

In another general aspect, a method for controlling power of a fuel cell system includes setting an output of a first converter, which adjusts power output from a fuel cell stack or a battery depending on a starting state or an operating state of the fuel cell system, and an output of a second converter, which adjusts power input to or output from the battery, controlling an operation of a power relay assembly depending on the starting state or the operating state of the fuel cell system, and controlling supplying of power of the fuel cell stack, the battery, and the super capacitor depending on the outputs of the first converter and the second converter and the operation of the power relay assembly.

The setting of the output may include setting a starting voltage of the fuel cell stack as an output voltage of the second converter, when the fuel cell system is started, and setting a limit current of the second converter or an allowable discharge current of the battery as a restriction current of the second converter.

The setting of the output may include setting a charging voltage of the super capacitor as the output voltage of the first converter, setting a value, which is obtained by subtracting a required current of an auxiliary device from an allowable discharge current of the battery, as an output current of the first converter, and setting a limit current of the first converter or an allowable charge current of the super capacitor as the restriction current of the first converter, when the fuel cell system is started.

The controlling of the supplying of the power may include supplying, by the second converter, starting power of the fuel cell system by using power discharged from the battery, when the fuel cell system is started.

The controlling of the supplying of the power may include supplying, by the second converter, charging power of the super capacitor by using power discharged from the battery, when the fuel cell system is started.

The method may further include adjusting, by the first converter, the charging power, which is received from the second converter, and supplying adjusted charging power to the super capacitor through the power relay assembly, when the fuel cell system is started.

The controlling of the supplying of the power may include adjusting, by a power relay assembly connected to the super capacitor, a voltage between an output stage of the first converter and the super capacitor by using a pre-charge relay before supplying the charging power to the super capacitor, and supplying, by the power relay assembly, the charging power to the super capacitor by using a main relay when the charging power is supplied through the first converter.

The setting of the output may include setting the output voltage of the first converter, based on a measured voltage of the super capacitor, when the fuel cell system is operated, setting an output current of the first converter, based on the ratio between added required power of the fuel cell stack and the battery, and the measured voltage of the super capacitor, and setting the restriction current of the first converter, based on the limit current of the first converter.

The setting of the output may include setting the output voltage of the second converter, based on a target voltage of the fuel cell stack, when the fuel cell system is operated, setting the output current of the second converter, based on the ratio between the target power of the battery and the measured voltage, and setting the restriction current of the second converter, based on the allowable discharge current of the battery.

The controlling of the supplying of the power may include adjusting and outputting, by the second converter, power discharged from the battery, when the fuel cell system is operated, and adjusting, by the first converter, power output through at least one of the fuel cell stack and the second converter and supplying the adjusted power to the inverter.

The controlling of the supplying of the power may include supplying, by the power relay assembly, the power discharged from the super capacitor to the inverter, when the fuel cell system is operated.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
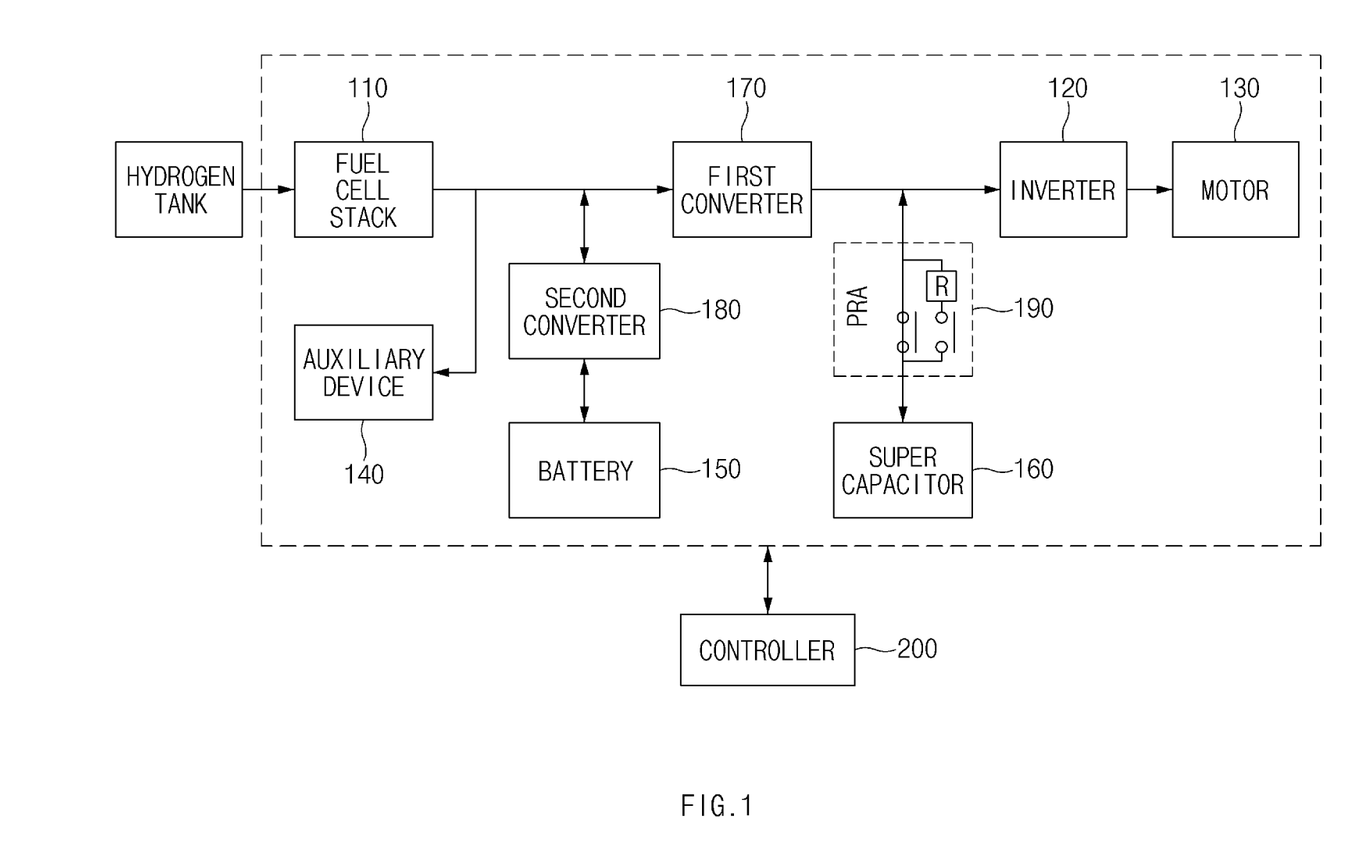
FIG. 1 is a view illustrating a fuel cell system, according to an embodiment of the present disclosure.

FIG. 1 is a view illustrating a fuel cell system, according to an embodiment of the present disclosure.

Referring to FIG. 1, according to an embodiment of the present disclosure, a fuel cell system may include a fuel cell stack 110, an inverter 120, a motor 130, auxiliary device 140, a battery 150, and a super capacitor 160, a first converter 170, a second converter 180, and a power relay assembly (PRA) 190. In addition, the fuel cell system may further include a controller 200 to control the power flow of the fuel cell system.

The fuel cell stack 110 (or which may be referred to as a 'fuel cell') has a structure capable of producing electricity through a redox reaction between a fuel (e.g., hydrogen) and an oxidizing agent (e.g., air). For example, the fuel cell stack 110 may include a membrane electrode assembly (MEA) in which catalyst electrode layers making electrochemical reactions are attached to opposite sides of an electrolyte membrane for moving hydrogen ions, a gas diffusion layer (GDL), which uniformly distributes reaction gases and transfers generated electrical energy, a gasket and fastening mechanism to maintain airtightness and proper fastening pressure of the reaction gases and a first coolant, and a bipolar plate to move the reaction gases and the first coolant.

In the fuel cell stack 110, hydrogen serving as fuel and air (oxygen) serving as an oxidizing agent are respectively supplied to an anode and cathode of the membrane electrode assembly through a fluid passage of a separator. In this case, the hydrogen may be supplied to the anode, and the air may be supplied to the cathode. The hydrogen supplied to the anode is decomposed into hydrogen ions (protons) and electrons (protons) by the catalyst of the electrode layers formed on opposite sides of the electrolyte membrane. Among them, only the hydrogen ion may be transmitted to the cathode through the electrolyte membrane which is a cation exchange membrane. In addition, the electron may be transmitted to the cathode through the gas diffusion layer and the separator which are conductors. In the cathode, hydrogen ions supplied through the electrolyte membrane and electrons transferred through the separator may meet with oxygen in the air supplied to the cathode by an air supply device to generate water. As electrons flow through an external conductive line due to the movement of the hydrogen ions, the electrical energy may be generated.

The fuel cell stack 110, which serves as a main power source of a vehicle, that is, a fuel cell vehicle, having the fuel cell system supplies power necessary for the driving of the motor 130 by using the produced electrical energy. In this case, the fuel cell vehicle may include an industrial vehicle, such as an excavator, at a construction site.

Meanwhile, the fuel cell stack 110 may supply power to charge the battery 150 and/or the super capacitor 160.

The output of the fuel cell stack 110 may be controlled by the controller 200.

The inverter 120, the motor 130, the auxiliary device 140, the battery 150, the super capacitor 160, the first converter 170, the second converter 180, and the power relay assembly (PRA) 190 may be connected to a main bus stage connected to an output stage of the fuel cell stack 110.

The inverter 120 converts high-voltage direct current (DC) power, which is received from the fuel cell stack 110, into alternating current (AC) power to drive the motor 130 and transmits the AC power to the motor 130.

The inverter 120 may receive the high-voltage DC power from the battery 150 and/or the super capacitor 160 connected to the main bus stage. In this case, the inverter 120 may convert the high-voltage DC power, which is received from the battery 150 or the super capacitor 160, into the AC power for driving the motor 130 and may provide the converted AC power to the motor 130.

When the fuel cell vehicle operates in a fuel cell mode, the inverter 120 may receive power for driving the motor 130 from the fuel cell stack 110. When the fuel cell vehicle operates in an electrical vehicle (EV) mode, the inverter 120 may receive the power for driving the motor 130 from the battery 150 and/or the super capacitor 160. Meanwhile, when the fuel cell vehicle operates in a hybrid mode, the inverter 120 may receive the power for driving the motor 130 from the fuel cell stack 110, the battery 150, and the super capacitor 160.

In this case, the inverter 120 may include a plurality of switching devices (not illustrated). A plurality of switching devices may be controlled through a pulse width modulation (PWM) scheme to generate the AC power. In this case, a scheme of controlling the plurality of switching devices is not limited to any one, and it is obvious that the plurality of switching devices may be controlled through different schemes according to embodiments.

The AC power generated from the inverter 120 is supplied to the motor 130. Accordingly, the motor 130 is driven using the AC power supplied from the inverter 120. The motor 130 may generate rotational force using the AC power supplied from the inverter 120, and may apply the generated rotational force to a driving wheel of the fuel cell vehicle.

Meanwhile, the motor 130 generates electrical energy by using braking force generated during regenerative braking. In this case, the inverter 120 may convert power of the electrical energy generated from the motor 130 during the regenerative braking and may provide the converted power as charging power of the super capacitor 160.

The auxiliary device 140 may include auxiliary devices necessary for driving the fuel cell stack 110. For example, the auxiliary device 140 may include a blower, an air compressor, an injector, a cooling water circulation pump, and various control valves.

The auxiliary device 140 may operate by receiving driving power from the fuel cell stack 110. In addition, the auxiliary device 140 may operate by receiving the driving power from the battery 150, when the fuel cell system is started at an initial stage.

The battery 150 is an auxiliary power source of the fuel cell vehicle and is charged using electrical energy generated from the fuel cell stack 110.

The battery 150 may discharge the charged electrical energy to supply power necessary for driving the motor 130.

In addition, the battery 150 may discharge electrical energy at the initial start of the fuel cell system to supply power required to drive the auxiliary device 140. In addition, the battery 150 may discharge the electrical energy charged at the initial start of the fuel cell system to supply power necessary for charging the super capacitor 160.

In this case, a discharge amount of the battery 150 may be controlled by the controller 200.

The super capacitor 160 is an auxiliary power source of the fuel cell vehicle like the battery 150, and is charged using electrical energy generated from the fuel cell stack 110. The super capacitor 160 may be charged using power supplied from the battery 150 at the initial start of the fuel cell system. In addition, the super capacitor 160 may be charged using power generated from the motor 130 during regenerative braking.

The super capacitor 160 may discharge the charged electrical energy to supply power necessary for driving the motor 130. The discharge amount of the super capacitor 160 may be controlled by the controller 200.

The first converter 170 may be disposed on the main bus stage between the fuel cell stack 110 and the inverter 120. The first converter 170, which is a power converter to adjust power output from the fuel cell stack 110 or the battery 150 and to output the adjusted power to the main bus stage, may include a uni-directional high voltage DC-DC converter (HDC).

For example, the first converter 170 may adjust power output from the fuel cell stack 110 or the battery 150 and may supply the adjusted power to the inverter 120 connected to the main bus stage.

In addition, the first converter 170 may adjust power output from the fuel cell stack 110 or the battery 150 and may supply the adjusted power to the super capacitor 160 connected to the main bus stage, such that the super capacitor 160 is charged with power.

In this case, the controller 200 may determine an output voltage, an output current, and a restriction current of the first converter 170. Accordingly, the first converter 170 may adjust power output to the main bus stage, depending on the output voltage, the output current, and the restriction current determined by the controller 200.

One end of the second converter 180 may be connected to the main bus stage between the fuel cell stack 110 and the first converter 170, and an opposite end of the second converter 180 may be connected to the battery 150.

The second converter 180, which is a power converter that adjusts power input to or output from the battery 150, may include a bi-directional high voltage DC-DC converter (BHDC) that controls bi-directional movement of a current.

For example, the second converter 180 may adjust the power supplied from the fuel cell stack 110 to supply the adjusted power as the charging power of the battery 150. In addition, the second converter 180 may adjust power generated from the motor 130 during the regenerative braking to supply the power as the charging power of the battery 150.

Meanwhile, the second converter 180 adjusts the power discharged from the battery 150 when the fuel cell system is started and outputs the power to the main bus stage. In this case, the power output to the main bus stage may be supplied as driving power of the auxiliary device 140, and may be supplied as charging power of the super capacitor 160.

In this case, the controller 200 may determine an output voltage, an output current, and a restriction current of the second converter 180. Accordingly, the first converter 180 may adjust power output to the main bus stage or the battery 150 depending on the output voltage, the output current, and the restriction current determined by the controller 200.

The power relay assembly 190 may include a main relay disposed on a line connecting the super capacitor 160 to the main bus stage, a pre-charge relay connected in parallel to the main relay, and a pre-charge resistor connected in series to one end of the pre-charge relay.

The power relay assembly 190 may apply or block power flowing between the super capacitor 160 and the main bus stage by opening and closing the main relay and the pre-charge relay. In this case, the opening and closing operations of the main relay and the pre-charge relay may be controlled by the controller 200.

In this case, the power relay assembly 190 may prevent the first converter 170 and the inverter 120 from being damaged by the remaining voltage of the super capacitor 160 when the fuel cell system is initially started.

The power relay assembly 190 may further include a current sensor (not illustrated). The current sensor may detect a direction of a current flowing between the super capacitor 160 and the main bus stage.

The controller 200 may perform power control for each unit of the fuel cell system. In this case, the controller 200 may be an upper controller.

The controller 200 according to the present embodiment may be a hardware device, such as a processor or a central processing unit (CPU), or a program implemented by a processor. The controller 200 may be connected to each component of the fuel cell system to perform an overall function of the fuel cell system.

When the fuel cell system is started, the controller 200 may control a power flow for starting the fuel cell stack 110 and charging the super capacitor 160.

In this case, the controller 200 may determine the outputs of the first converter 170 and the second converter 180 and may control the operation of the power relay assembly 190.

For example, the controller 200 drives the second converter 180 in a constant voltage mode to start the fuel cell stack 110. In this case, the controller 200 determines the output voltage of the second converter 180 to the starting voltage. In addition, the controller 200 sets a limit current of the second converter 180 or an allowable discharge current of the battery 150 to a restriction current of the second converter 180. In this case, the controller 200 may determine a less value of the limit current of the second converter 180 and the allowable discharge current of the battery 150, as the restriction current of the second converter 180.

Accordingly, when the battery 150 discharges power, the second converter 180 may supply power discharged from the battery 150 to the auxiliary device 140 to start the fuel cell stack 110.

Meanwhile, since the voltage of the super capacitor 160 naturally decreases due to self-discharge when left unattended, charging of the super capacitor 160 is required when the fuel cell system is started at the initial stage. Accordingly, when the fuel cell stack 110 is started, the controller 200 operates the power relay assembly 190 for charging the super capacitor 160 and drives the first converter 170 in a constant current mode.

In this case, the controller 200 determines the output voltage of the first converter 170 to the charging voltage of the super capacitor 160. In addition, the controller 200 determine, as the output current of the first converter 170, a value obtained by subtracting a required current of the auxiliary device 140 from the allowable discharge current of the battery 150. In addition, the controller 200 determines, as the restriction current of the first converter 170, the limit current of the first converter 170 or an allowable charge current of the super capacitor 160. In this case, the controller 200 may determine a less value of the limit current of the first converter 170 and an allowable charge current of the super capacitor 160 as the restriction current of the first converter 170.

Accordingly, when the fuel cell system is initially started, the first converter 170 and the second converter 180 may supply some of the power discharged from the battery 150 as power for charging the super capacitor 160. For example, the first converter 170 and the second converter 180 may supply the remaining power of the power, which discharged from the battery 150 to the super capacitor 160, except for the required power of the auxiliary device 140.

In this case, the power relay assembly 190 induces a voltage of the super capacitor 160, an output voltage of the first converter 170, and an input voltage of the inverter 120 to be equal to each other, by using the pre-charge relay before driving the first converter 170. Thereafter, when the first converter 170 is operated in a constant current mode, the power relay assembly 190 supplies charging power to the super capacitor 160 through the main relay.

Hereinafter, the operation of controlling power when the fuel cell system is started will be described in more detail with reference to FIGS. 2A and 2B.

Figure 2A:
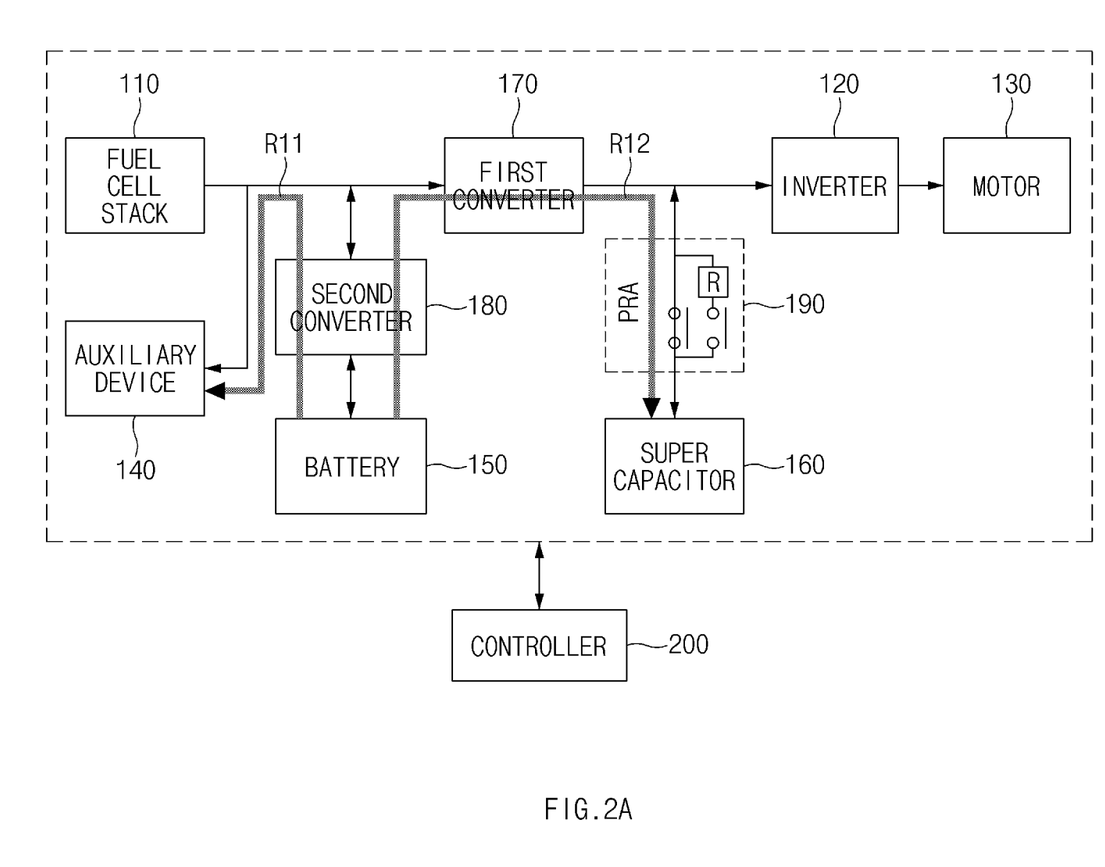
FIG. 2A is a view illustrating energy flow when a fuel cell system is started, according to an embodiment of the present disclosure.

FIG. 2A is a view illustrating energy flow when a fuel cell system is started, according to an embodiment of the present disclosure. FIG. 2B is a view illustrating the operating state of a converter when a fuel cell system is started, according to an embodiment of the present disclosure.

Figure 2B:
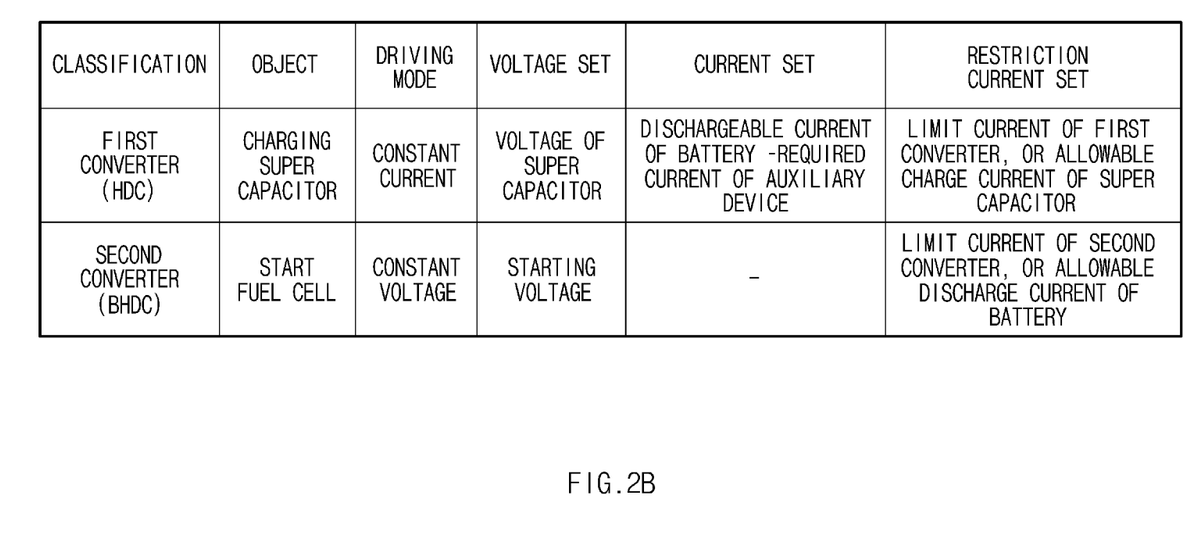
FIG. 2B is a view illustrating the operating state of a converter, when a fuel cell system is started, according to an embodiment of the present disclosure.

Referring to FIGS. 2A and 2B, the controller 200 may determine the driving mode, the output voltage, and the restriction current of the second converter 180, to provide power to the auxiliary device 140 along a first route R11, when the fuel cell system is started.

In this case, as illustrated in FIG. 2B, the controller 200 may set the driving mode of the second converter 180 to a constant voltage mode, set the output voltage of the second converter 180 by the starting voltage, and set the restriction current of the second converter 180 by the limit current of the second converter 180, or the allowable discharge current of the battery 150, for starting the fuel cell.

In addition, the controller 200 may set the driving mode, the output voltage, the output current, and the restriction current of the first converter 170 to provide charging power to the super capacitor 160 along a second route R12, when the fuel cell system is initially started.

In this case, as illustrated in FIG. 2B, the controller 200 may set the driving mode of the first converter 170 to a constant current mode, may set the output voltage of the first converter 170 to the voltage of the super capacitor 160, set the output current of the first converter 170 to a value, which is obtained by subtracting the required current of the auxiliary device 140 from a dischargeable current of the battery 150, and set a restriction current to the limit current of the first converter 170 or an allowable charge current of the super capacitor 160, for charging of the super capacitor 160.

As illustrated in FIG. 2B, when the outputs of the first converter 170 and the second converter 180 are determined, the battery 150 discharges electrical energy, and the second converter 180 adjusts power discharged from the battery 150 to supply starting power to the auxiliary device 140 along the first route R11.

Accordingly, the auxiliary device 140 completes starting by driving the fuel cell stack 110 by using power supplied from the second converter 180.

In addition, the second converter 180 may adjust the power discharged from the battery 150 to output the adjusted power to the first converter 170 along a second route R12. In this case, the first converter 170 adjusts the power output from the second converter 180 to supply charging power to the super capacitor 160 along the second route R12.

In this case, the controller 200 may control the power relay assembly 190, which is connected to the super capacitor 160 on the second route R12, to be turned on, before the charging power is supplied from the first converter 170.

Accordingly, the power relay assembly 190 transmits the charging power supplied from the first converter 170 to the super capacitor 160 to charge the super capacitor 160.

The controller 200 may control the operation of the power relay assembly 190 to be turned off, when the charging of the super capacitor 160 is completed.

Meanwhile, the controller 200 may control the power flow of the fuel cell stack 110, the battery 150, and the super capacitor 160 during operation after the starting of the fuel cell stack 110 is completed.

In this case, the controller 200 may determine the outputs of the first converter 170 and the second converter 180 and may control the operation of the power relay assembly 190.

For example, the controller 200 may control the output of the first converter 170 to supply the output power of the fuel cell stack 110 to the inverter 120, when the fuel cell system is operated.

When the fuel cell vehicle operates in the hybrid mode, the controller 200 may supply power from the battery 150 and/or the super capacitor 160 to the inverter 120 for a load variation, which exceeds the reference range, of the fuel cell stack 110.

In this case, the controller 200 may control the output of the first converter 170, based on the added required power of the fuel cell stack 110 and the battery 150. In addition, the controller 200 may control the output of the second converter 180, based on the target power of the battery 150 and the target voltage of the fuel cell stack 110 to supply power from the battery 150 to the inverter 120.

In addition, the controller 200 may control the relay operation of the power relay assembly 190 to supply the power, which is charged in the super capacitor 160, to the inverter 120.

Hereinafter, the operation of controlling power when a fuel cell system is operated will be described with reference to FIGS. 3A and 3B.

Figure 3A:
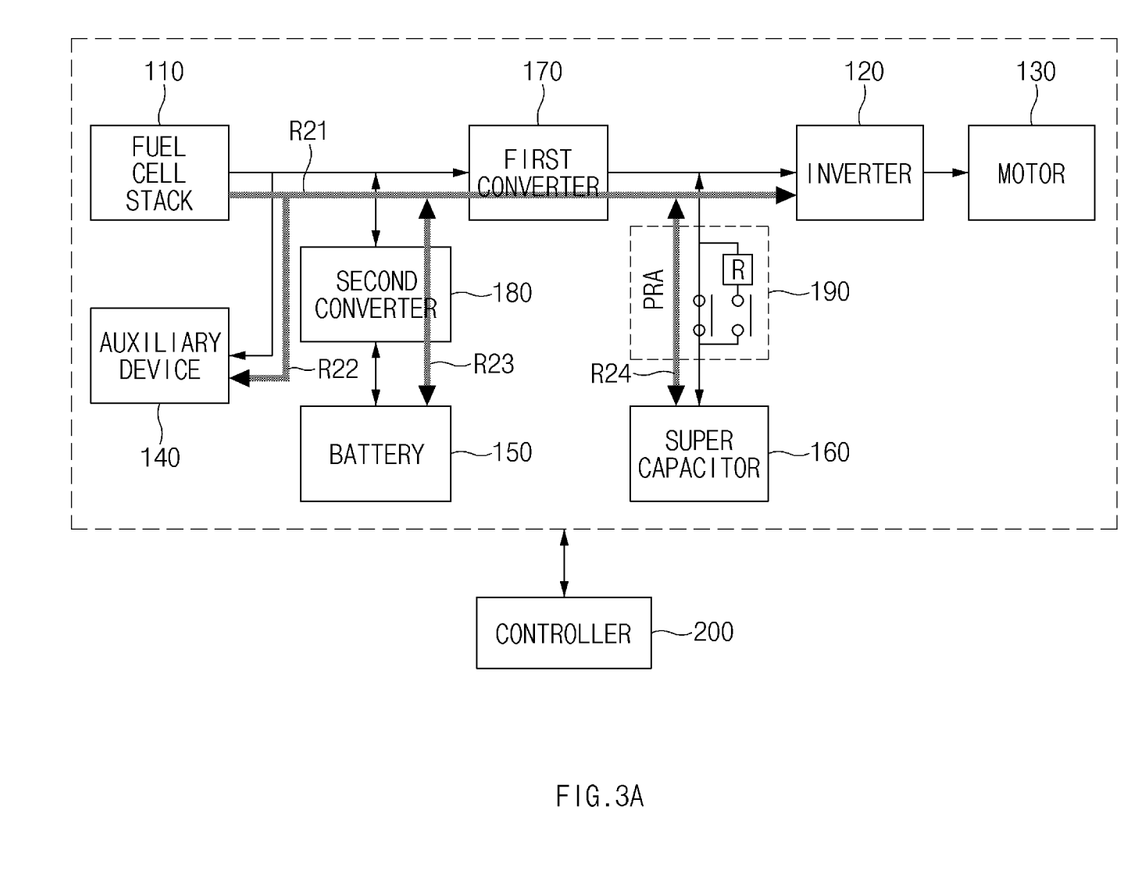
FIG. 3A is a view illustrating energy flow when a fuel cell system is operated, according to an embodiment of the present disclosure.
Figure 3B:
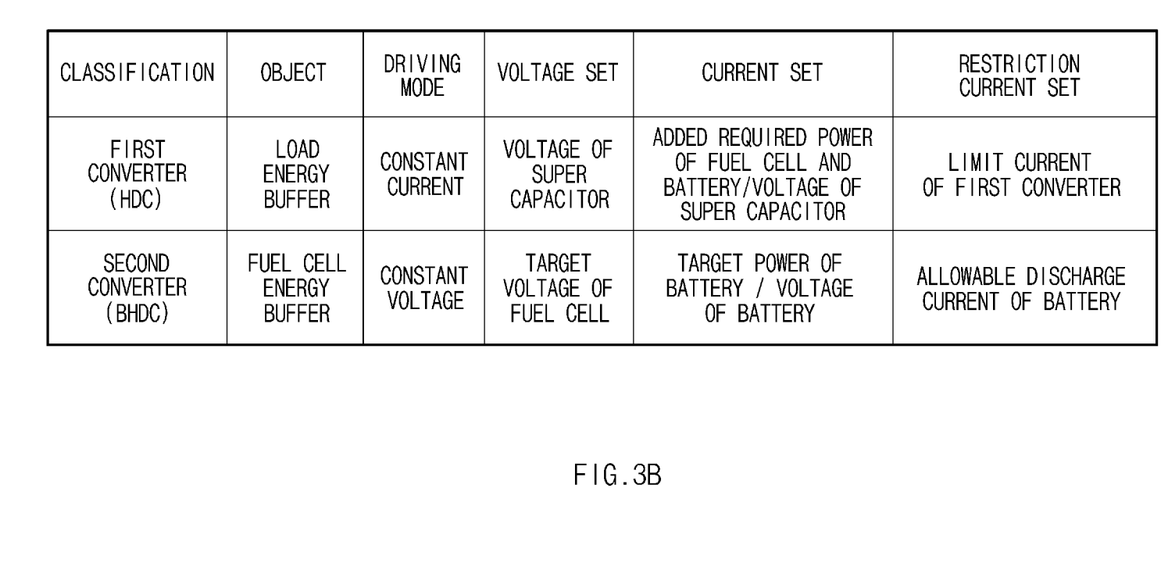
FIG. 3B is a view illustrating the operating state of a converter, when a fuel cell system is operated, according to an embodiment of the present disclosure.

FIG. 3A is a view illustrating energy flow when a fuel cell system is operated, according to an embodiment of the present disclosure, and FIG. 3B is a view illustrating the operating state of a converter when a fuel cell system is operated, according to an embodiment of the present disclosure.

Referring to FIGS. 3A and 3B, when the fuel cell system is operated, the fuel cell stack 110 supplies power to the inverter 120 along a third route R21. In this case, the fuel cell stack 110 supplies, to the inverter 120, power corresponding to the variation of the load of the inverter 120, which is measured when the inverter 120 and the motor 130 are driven, and present in a first range of a static load consecutively measured.

In this case, the first converter 170 disposed on the third route R21 may adjust the power supplied from the fuel cell stack 110 and may output the power to the inverter 120.

The fuel cell stack 110 may supply driving power to the auxiliary device 140 along a fourth route R22 connected to the third route R21. In addition, the fuel cell stack 110 may supply charging power to the battery 150 and/or the super capacitor 160 along a fifth route R23 and/or a sixth route R24 connected to the third route 21.

When power is requested to be supplied to the inverter 120 during operation of the fuel cell system, the battery 150 may supply power to the inverter 120 along the fifth route R23 and the third route R21.

In this case, the battery 150 may supply, to the inverter 120, power, which corresponds to the variation of a load of the inverter 120 measured when the inverter 120 and the motor 130 are driven and present within a second range set for a band pass filter (BPF). The second range may correspond to an intermediate frequency range between the first range of a static load supplied by the fuel cell and a third range set for a high pass filter. The detailed range may be modified according to embodiments.

In this case, the second converter 180 disposed on the fifth rout R23 and the first converter 170 disposed on the third route R21 may adjust power supplied from the battery 150 and output the adjusted power to the inverter 120

In this case, the first converter 170 may adjust power, based on the sum of the power of the fuel cell stack 110 and the power supplied from the battery 150, and may output the adjusted power to the inverter 120, when the power is supplied from the fuel cell stack 110 and the battery 150.

In addition, when power is requested to be supplied to the inverter 120 during operation of the fuel cell system, the super capacitor 160 may supply power to the inverter 120 along a sixth route R24 and the fourth route R22.

In this case, the super capacitor 160 may supply, to the inverter 120, power corresponding to the variation of a load of the inverter 120, which is measured when the inverter 120 and the motor 130 are driven and present within a third range set to the HPF (High Pass Filter) of the load of the inverter 120. In this case, the third range may be a load range that is rapidly fluctuated, and may correspond to a frequency range higher than the second range. The detailed range may be modified according to embodiments.

In this case, the power relay assembly 190 disposed on the sixth route R24 may provide power supplied from the super capacitor 160 to the inverter 120.

Accordingly, the controller 200 may control operations of the first converter 170, the second converter 180, and the power relay assembly 190 to supply power of the fuel cell stack 110, the battery 150, and the super capacitor 160 to the inverter 120, when the fuel cell system is operated.

In this case, as illustrated in FIG. 3B, the controller 200 sets the driving mode of the first converter 170 to the constant current mode. In addition, the controller 200 may set the output voltage of the first converter 170 to the measured voltage of the super capacitor 160, set the output current based on the ratio of the added required power of the fuel cell stack 110 and the battery 150 to the measured voltage of the super capacitor 160, and set the restriction current to the limit current of the first converter 170.

In addition, the controller 200 sets the driving mode of the second converter 180 to the constant voltage mode. In addition, the controller 200 may set the output voltage of the second converter 180 to the target voltage of the fuel cell stack 110, set the output current, based on the ratio of the target power of the battery 150 to the measured voltage of the battery 150, and set the restriction current to the allowable discharge current of the battery 150.

As illustrated in FIG. 3B, when the outputs of the first converter 170 and the second converter 180 are determined, the fuel cell stack 110 may output power by the target power. In this case, the output power may be output to the first converter 170 and the auxiliary device 140. The first converter 170 adjusts the power output from the fuel cell stack 110 and supplies the adjusted power to the inverter 120 along the third route R21.

In this case, the target power of the fuel cell stack 110 may be obtained by adding the required power of the auxiliary device 140 and the required power of the fuel cell stack 110. The required power of the fuel cell stack 110 may be obtained by subtracting the target power of the battery 150 from the added required power of the fuel cell stack 110 and the battery 150.

The added required power of the fuel cell stack 110 and the battery 150 may be obtained by subtracting the target power of the super capacitor 160 from the load measured when the inverter 120 is driven. The target power of the super capacitor 160 may be obtained by subtracting power, which is calculated corresponding to a voltage obtained by subtracting the measured voltage of the super capacitor 160 from the target voltage calculated based on the target SOC of the super capacitor 160, from the required power of the super capacitor 160, which is calculated through the HPF, of the load of the inverter 120.

The target power of the battery 150 may be obtained by subtracting power, which is calculated corresponding to a voltage obtained by subtracting the measured voltage of the battery 150 from the target voltage calculated based on the target SOC of the battery 150, from the required power of the battery 150 calculated through BPF, of the added required power of the fuel cell stack 110 and the battery 150.

In addition, the battery 150 may discharge energy by the target power, and the second converter 180 may adjust the power discharged from the battery 150 to output the adjusted power to the first converter 170 along the fifth route R23 and third route R21. In this case, the first converter 170 adjusts the power output from the second converter 180 to supply power to the inverter 120 along the second route R21.

In addition, the super capacitor 160 discharges energy by the target power, and the power relay assembly 190 supplies power, which is discharged from the super capacitor 160, to the inverter 120.

Accordingly, the inverter 120 operates while consecutively receiving power, which is within the first range, from the fuel cell stack 110. In addition, the inverter 120 may receive power through the battery 150 with respect to a load variation within the second range, and power through the super capacitor 160 with respect to the rapid load variation within the third range, during the operation of the inverter 120.

Hereinafter, the operating flow of the fuel cell system having the above structure according to the present disclosure will be described in more detail.

Figure 4:
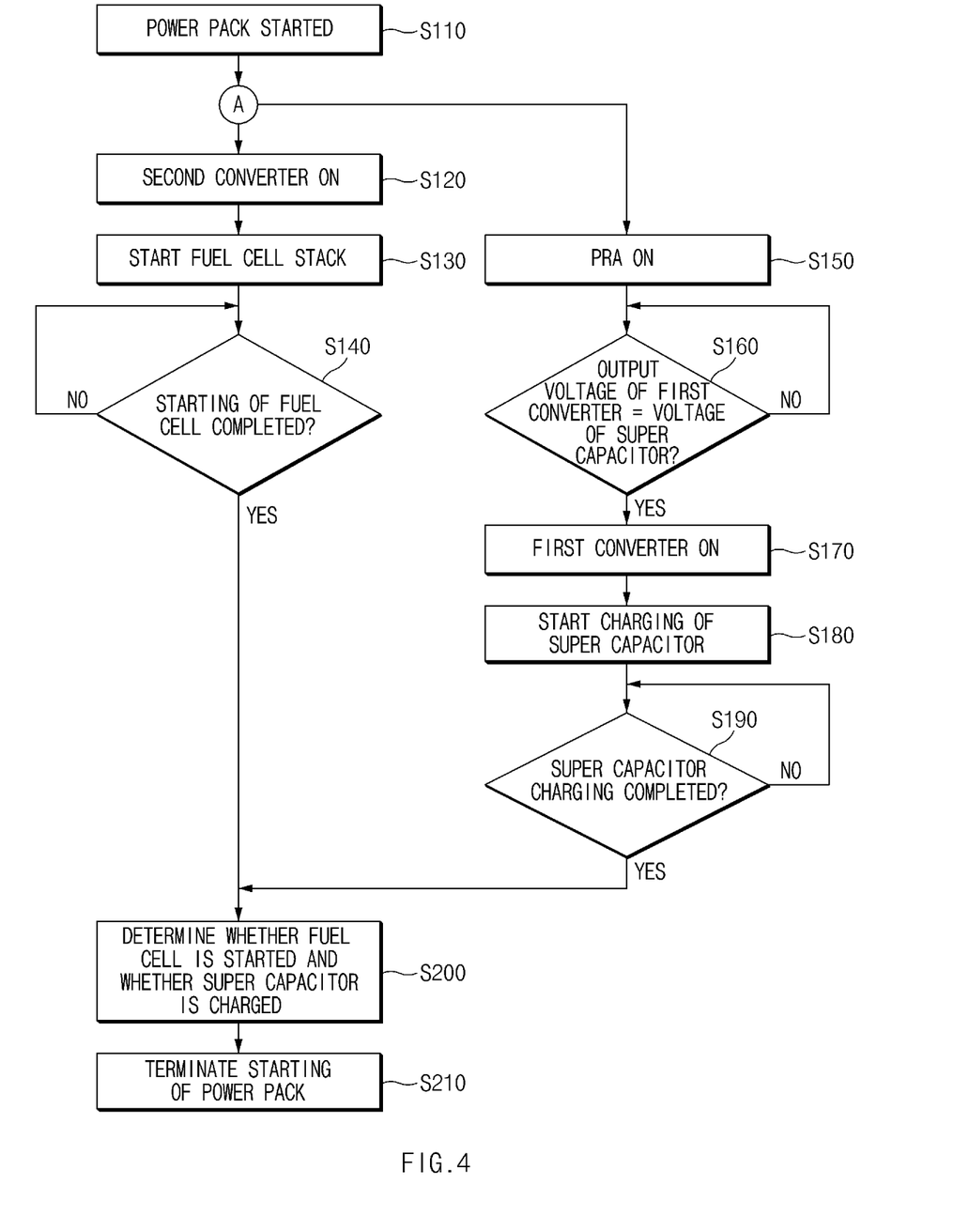
FIGS. 4 and 5 are views illustrating the operating flow for a method for controlling power of a fuel cell system, according to an embodiment of the present disclosure.

FIG. 4 is a view illustrating the operating flow for a method for controlling power when a fuel cell system is started, according to an embodiment of the present disclosure.

Referring to FIG. 4, when a power pack is started (S110), the fuel cell system controls the second converter 180 to be turned on (S120), and controls the power relay assembly (PRA) 190 to be turned on (S150).

The fuel cell system starts the fuel cell stack 110, as the power of the battery 150 is supplied to the auxiliary device 140 through the second converter 180 in S120 (S130).

Meanwhile, when the output voltage of the first converter 170 is equal to the voltage of the super capacitor 160 by the pre-charge relay of the power relay assembly PRA 190 in S150 (S160), the fuel cell system controls the first converter 170 to be turned on (S170).

Thereafter, the fuel cell system starts charging the super capacitor 160 by supplying power of the battery 150 to the super capacitor 160 through the second converter 180 and the first converter 170 (S180).

The fuel cell system determines whether the starting of the fuel cell stack 110 is completed (S140). In addition, the fuel cell system determines whether charging of the super capacitor 160 is completed (S190).

The fuel cell system terminates the starting of the power pack (S210), when the start state of the fuel cell stack 110 is confirmed and the charge completion state of the super capacitor 160 is confirmed (S200).

Thereafter, the fuel cell system may start the operation of the fuel cell system.

Figure 5:
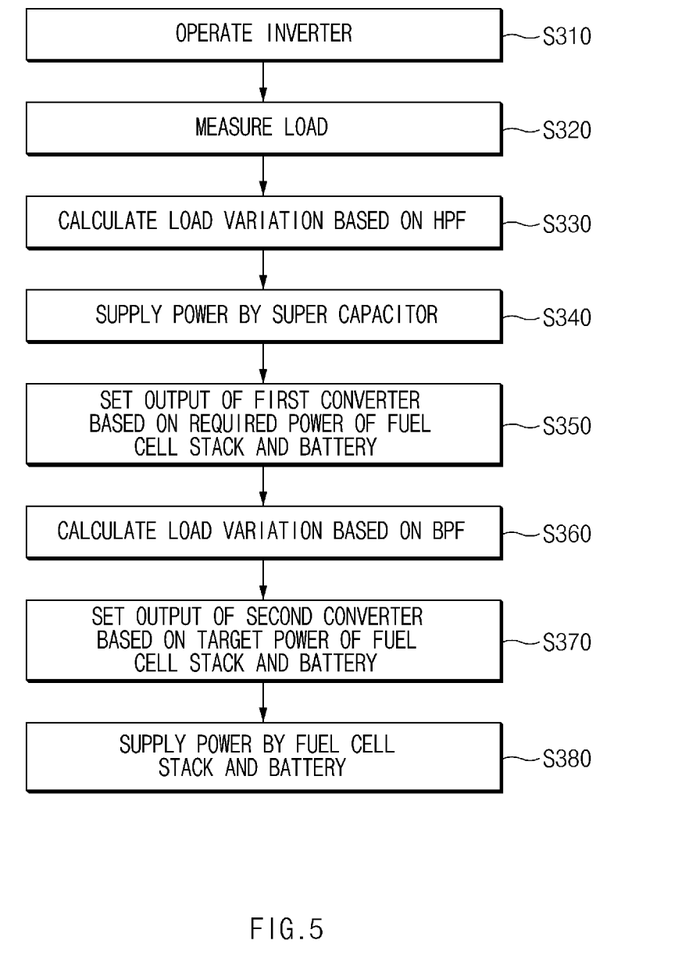

FIG. 5 is a view illustrating an operating flow of a method for controlling power during operation of a fuel cell system according to an embodiment of the present disclosure.

Referring to FIG. 5, when the inverter 120 is operated (S310), the fuel cell system measures a load (S320).

The fuel cell system calculates the variation of the load measured in S320 based on the HPF (S330), and supplies power corresponding to the load variation calculated in the S330 from the super capacitor 160 to the inverter 120 (S340).

In addition, the fuel cell system calculates the remaining part of load measured in S320 except for the power supplied by the super capacitor 160 in S340, as the added required power of the fuel cell stack 110 and the battery 150, and sets the output of the first converter 170 based on the added required power of the fuel cell stack 110 and the battery 150 (S350).

A detailed operation of setting the output of the first converter 170 in step S350 will be described with reference to FIG. 6A.

Figure 6A:
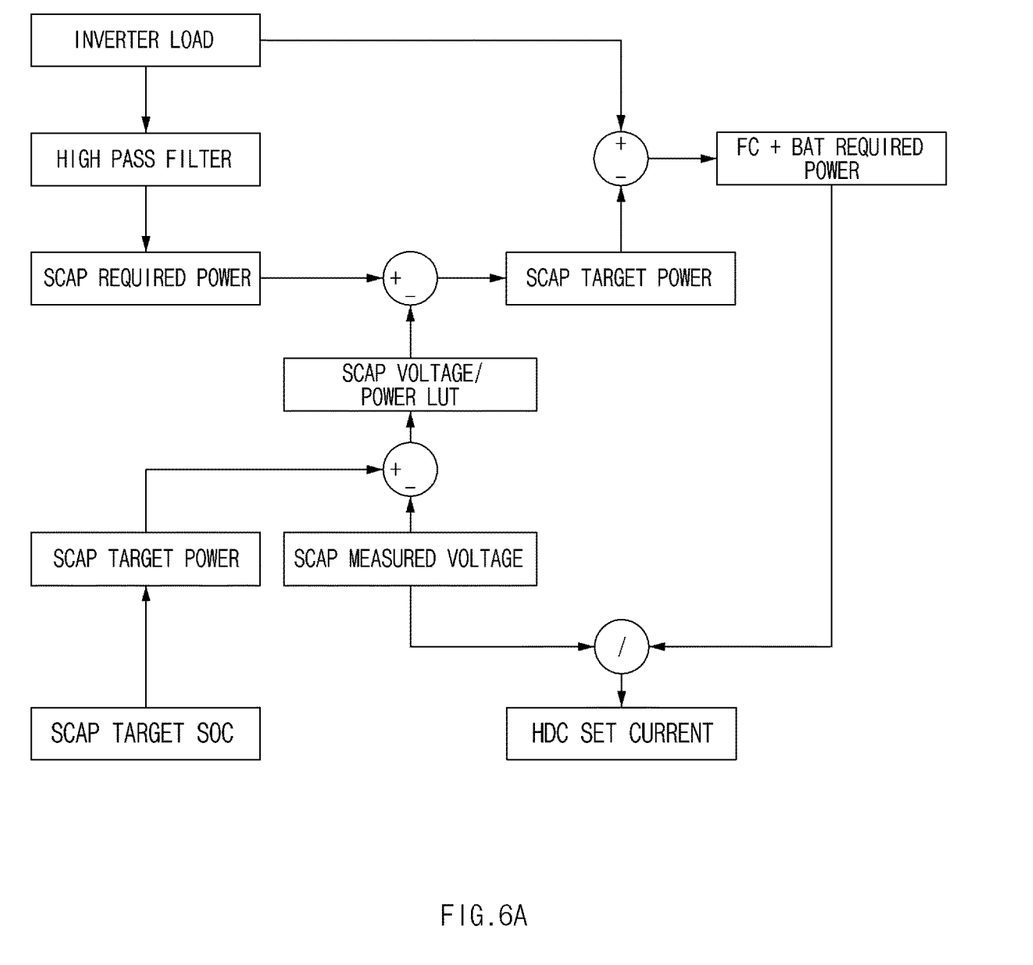
FIG. 6A illustrates an operation of setting an output of a first converter.

Referring to FIG. 6A, the fuel cell system may supply, through the first converter (HDC) 170, the added required power (FC+BAT required power) of the fuel cell stack 110 and the battery 150, which is obtained by subtracting the target power (Scap target power) of the super capacitor 160 from the load of the inverter.

In this case, the Scap target power may be obtained by subtracting specific Scap power from the Scap required power. The Scap required power may be calculated based on a high pass filter (HPF) among the loads of the inverter 120. The specific Scap power may be obtained by applying a voltage value, which is obtained by subtracting the measured Scap voltage from the Scap target voltage calculated based on the target SOC of the Scap to the lookup table (LUT)

In addition, the fuel cell system may set the output current of the first converter HDC 170 based on the ratio of the FC+BAT required power to the Scap measured voltage.

In addition, the fuel cell system may set the output voltage of the first converter HDC 170 based on the measured Scap voltage.

In addition, the fuel cell system calculates a load variation, based on a band pass filter (BPF) of the added required power of the fuel cell stack 110 and the battery 150 (S360). In this case, the fuel cell system may calculate the target power of the battery 150 based on the load variation calculated in S360.

The fuel cell system sets the output of the second converter 180 based on the target power of the battery 150 and the target power of the fuel cell stack 110 (S370).

A detailed operation of setting the output of the second converter 180 in S370 will be described with reference to FIG. 6B.

Figure 6B:
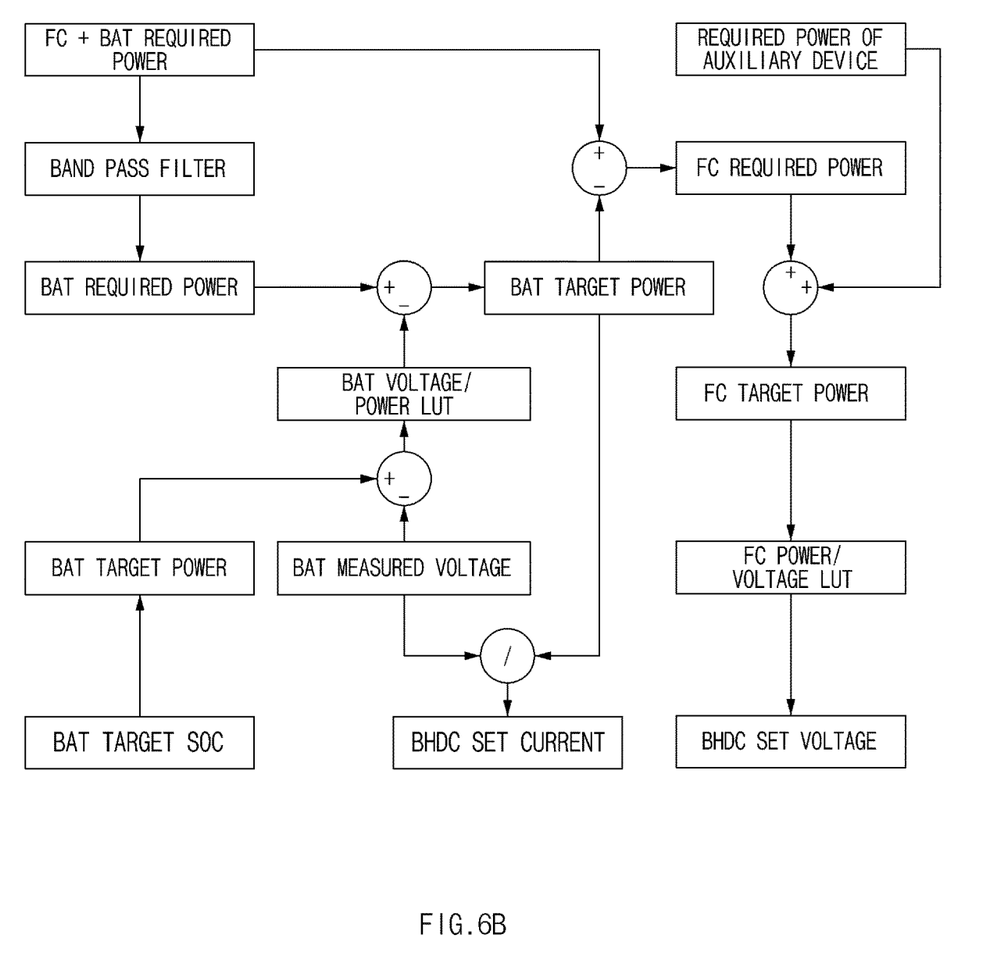
FIG. 6B illustrates an operation of setting an output of a second converter.

Referring to FIG. 6B, the fuel cell system may set an output current of the second converter BHDC 180 from a ratio of the target power (BAT target power) of the battery 150 to the measured voltage (BAT measurement voltage) of the battery 150.

In this case, the BAT target power may be obtained by subtracting specific BAT power from the BAT required power. The BAT required power may be calculated from the added required power of FC+BAT, based on based on the BPF. The specific BAT power may be obtained by applying a voltage value, which is obtained by subtracting the BAT measured voltage from the BAT target voltage calculated based on the BAT target SOC, to the lookup table LUT.

In addition, the fuel cell system may set the output voltage of the second converter BHDC 180 based on the target voltage of the fuel cell stack 110.

In this case, the FC target voltage may be obtained by applying the FC target power to the lookup table LUT. The FC target power may be obtained by adding the required power of the auxiliary device 140 to the FC required power. In addition, the FC required power may be obtained by subtracting the BAT target power from the BAT+FC required power.

When the outputs of the first converter 170 and the second converter 180 are determined through the above processes, the fuel cell stack 110 and the battery 150 supply power to the inverter 120 (S380). In step S380, the fuel cell stack 110 may supply power to the inverter 120 through the first converter 170, and the battery 150 may supply power to the inverter 120 through the second converter 180 and the first converter 170.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

According to the present disclosure, the converter applied to the power net may be substituted with the power relay assembly (PRA), thereby minimizing the number of the converters to reduce costs and efficiently operating several energy sources.

Therefore, the embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell system comprising:
   a fuel cell stack;
   a battery;
   a first converter configured to convert power, output from the fuel cell stack or the battery, into converted power and output the converted power;
   a second converter configured to convert power which is input to or output from the battery;
   a power relay assembly configured to control power flow between a super capacitor and the first converter; and
   a controller configured to control outputs of the first converter and the second converter, depending on a starting state or an operating state of the fuel cell system, and to control an operation of the power relay assembly.

2. The fuel cell system of claim 1, wherein the first converter is disposed on a main bus stage to connect the fuel cell stack to an inverter, and
   wherein the second converter has one end connected to the main bus stage between the fuel cell stack and the first converter, and an opposite end connected to the battery, and is configured to adjust bi-directional power flow.

3. The fuel cell system of claim 2, wherein the second converter is configured to supply starting power of the fuel cell system and charging power of the super capacitor, by using power discharged from the battery, when the fuel cell system is started.

4. The fuel cell system of claim 3, wherein the first converter is configured to supply the charging power, which is received from the second converter, to the super capacitor through the power relay assembly, when the fuel cell system is started.

5. The fuel cell system of claim 4, wherein the power relay assembly is configured to adjust a voltage between an output stage of the first converter and the super capacitor by using a pre-charge relay before receiving the charging power through the first converter, and to supply the charging power to the super capacitor by using a main relay when the charging power is supplied through the first converter.

6. The fuel cell system of claim 3, wherein the controller is configured to:
operate the first converter in a constant current mode, and to operate the second converter in a constant voltage mode, when the fuel cell system is started.

7. The fuel cell system of claim 3, wherein the controller is configured to:
set a starting voltage of the fuel cell stack as an output voltage of the second converter, when the fuel cell system is started, and
set a limit current of the second converter or an allowable discharge current of the battery as a restriction current of the second converter.

8. The fuel cell system of claim 3, wherein the controller is configured to:
set a charging voltage of the super capacitor as an output voltage of the first converter, when the fuel cell system is started;
set a value, which is obtained by subtracting a required current of an auxiliary device from an allowable discharge current of the battery, as an output current of the first converter; and
set a limit current of the first converter or an allowable charge current of the super capacitor as a restriction current of the first converter.

9. The fuel cell system of claim 2, wherein the second converter is configured to adjust output power discharged from the battery, when the fuel cell system is operated, and
wherein the first converter is configured to adjust power output through at least one of the fuel cell stack and the second converter and to output the adjusted power to the inverter, when the fuel cell system is operated.

10. The fuel cell system of claim 9, wherein the controller is configured to:
operate the first converter in a constant current mode and the second converter in a constant voltage mode, when the fuel cell system is operated.

11. The fuel cell system of claim 9, wherein the controller is configured to:
set an output voltage of the first converter, based on a measured voltage of the super capacitor, when the fuel cell system is operated;
set an output current of the first converter, based on a ratio between added required power of the fuel cell stack and the battery, and a measured voltage of the super capacitor; and
set a restriction current of the first converter, based on a limit current of the first converter.

12. The fuel cell system of claim 9, wherein the controller is configured to:
set an output voltage of the second converter, based on a target voltage of the fuel cell stack, when the fuel cell system is operated;
set an output current of the second converter, based on a ratio between a target power of the battery and a measured voltage of the battery; and
set a restriction current of the second converter, based on an allowable discharge current of the battery.

13. The fuel cell system of claim 2, wherein the power relay assembly is configured to supply power, which is discharged from the super capacitor, to the inverter, when the fuel cell system is operated.

14. A method for controlling power of a fuel cell system, the method comprising:
setting an output of a first converter, operably connected to a fuel cell stack and a battery, which adjusts power output from the fuel cell stack or the battery depending on a starting state or an operating state of the fuel cell system, and an output of a second converter, which adjusts power input to or output from the battery;
controlling an operation of a power relay assembly between a super capacitor and the first converter depending on the starting state or the operating state of the fuel cell system; and
controlling supplying of power of the fuel cell stack, the battery, and the super capacitor depending on the outputs of the first converter and the second converter, and the operation of the power relay assembly.

15. The method of claim 14, wherein setting the output of the first converter and the output of the second converter includes:
setting a starting voltage of the fuel cell stack as an output voltage of the second converter, when the fuel cell system is started;
setting a limit current of the second converter or an allowable discharge current of the battery as a restriction current of the second converter;
setting a charging voltage of the super capacitor as the output voltage of the first converter, when the fuel cell system is started;
setting a value, which is obtained by subtracting a required current of an auxiliary device from an allowable discharge current of the battery, as an output current of the first converter; and
setting a limit current of the first converter or an allowable charge current of the super capacitor as a restriction current of the first converter.

16. The method of claim 14, wherein controlling the supplying of the power includes:
supplying, by the second converter, starting power of the fuel cell system and charging power of the super capacitor by using power discharged from the battery, when the fuel cell system is started; and
adjusting, by the first converter, charging power, which is received from the second converter, and supplying the adjusted charging power to the super capacitor through the power relay assembly, when the fuel cell system is started.

17. The method of claim 16, wherein controlling the supplying of the power includes:
adjusting, by a power relay assembly connected to the super capacitor, a voltage between an output stage of the first converter and the super capacitor by using a pre-charge relay, before supplying the charging power to the super capacitor; and
supplying, by the power relay assembly, the charging power to the super capacitor by using a main relay, when the charging power is supplied through the first converter.

18. The method of claim 14, wherein setting the output of the first converter and the output of the second converter includes:
setting an output voltage of the first converter, based on a measured voltage of the super capacitor, when the fuel cell system is operated;
setting an output current of the first converter, based on a ratio between added required power of the fuel cell stack and the battery, and a measured voltage of the super capacitor;

setting a restriction current of the first converter, based on a limit current of the first converter;

setting an output voltage of the second converter, based on a target voltage of the fuel cell stack, when the fuel cell system is operated;

setting an output current of the second converter, based on a ratio between a target power of the battery and a measured voltage of the battery; and setting a restriction current of the second converter, based on an allowable discharge current of the battery.

19. The method of claim 14, wherein controlling the supplying of the power includes:

adjusting and outputting, by the second converter, power discharged from the battery, when the fuel cell system is operated; and adjusting, by the first converter, power output through at least one of the fuel cell stack and the second converter, and supplying the adjusted power to the inverter.

20. The method of claim 14, wherein controlling the supplying of the power includes:

supplying, by the power relay assembly, a power discharged from the super capacitor to the inverter, when the fuel cell system is operated.

* * * * *